United States Patent [19]

Mouille et al.

[11] 4,273,511
[45] Jun. 16, 1981

[54] MAIN ROTOR FOR A HELICOPTER

[75] Inventors: René L. Mouille, Aix-en-Provence; Marcel A. S. Lafargue, Marignane, both of France

[73] Assignee: Societe Nationale Industrielle Aerospatiale, France

[21] Appl. No.: 923,430

[22] Filed: Jul. 10, 1978

[30] Foreign Application Priority Data

Jul. 13, 1977 [FR] France .............................. 77 21657

[51] Int. Cl.³ .............................................. B64C 27/48
[52] U.S. Cl. .................................. 416/134 A; 416/141
[58] Field of Search ............... 416/134 A, 136, 138 A, 416/141, 230 A

[56] References Cited

U.S. PATENT DOCUMENTS

| 2,949,967 | 8/1960 | Jovanovich | 416/138 A X |
|---|---|---|---|
| 3,231,222 | 1/1966 | Scheutzow | 416/138 A X |
| 3,484,174 | 12/1969 | McCoubrey | 416/230 A X |
| 3,669,566 | 6/1972 | Bourquardez et al. | 416/230 A |
| 3,762,834 | 10/1973 | Bourquardez et al. | 416/230 A |
| 3,874,815 | 4/1975 | Baskin | 416/134 A |
| 3,880,551 | 4/1975 | Kisovec | 416/141 X |
| 4,012,169 | 3/1977 | Mouille et al. | 416/141 X |
| 4,047,839 | 9/1977 | Ferris et al. | 416/134 A |
| 4,053,258 | 10/1977 | Mouille | 416/138 A X |
| 4,087,203 | 5/1978 | Ferris | 416/141 |
| 4,093,400 | 6/1978 | Rybicki | 416/141 |
| 4,104,003 | 8/1978 | Mouille | 416/134 A |

FOREIGN PATENT DOCUMENTS 1334446 7/1963 France .................................... 416/141

Primary Examiner—Everette A. Powell, Jr.
Attorney, Agent, or Firm—Karl W. Flocks

[57] ABSTRACT

The invention relates to a rotor, specially for a helicopter. This rotor comprises a plurality of blades connected to a rotor hub by flexible, twistable, substantially radial strips, surrounded by tubular rigid sleeves. Rigid rings are secured to the inner ends of the tubular sleeves. Spherical ball and socket joint members are inserted between each radial strip and the rigid ring. The joint members are associated with frequency adaptors for drag movements of the corresponding blade.

4 Claims, 15 Drawing Figures

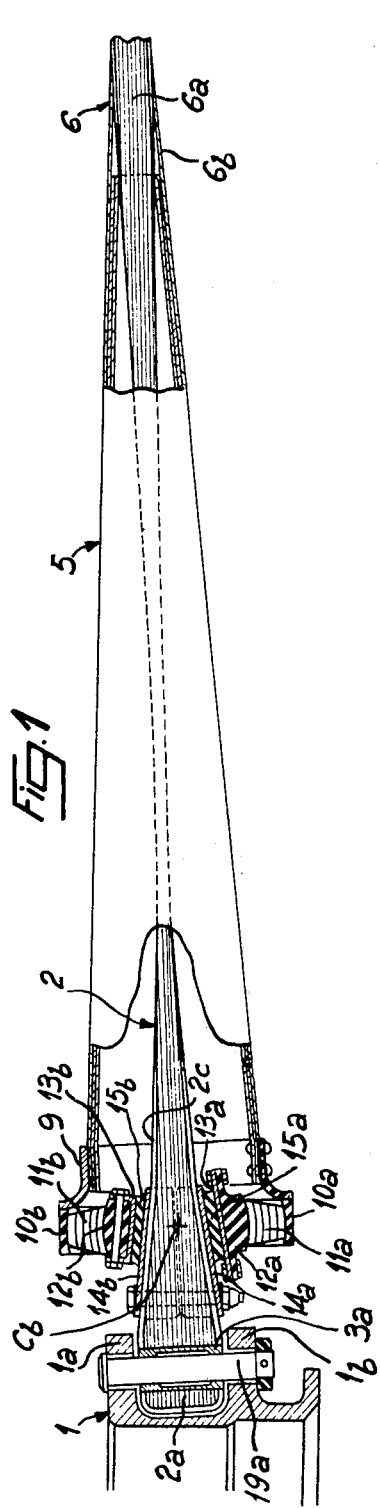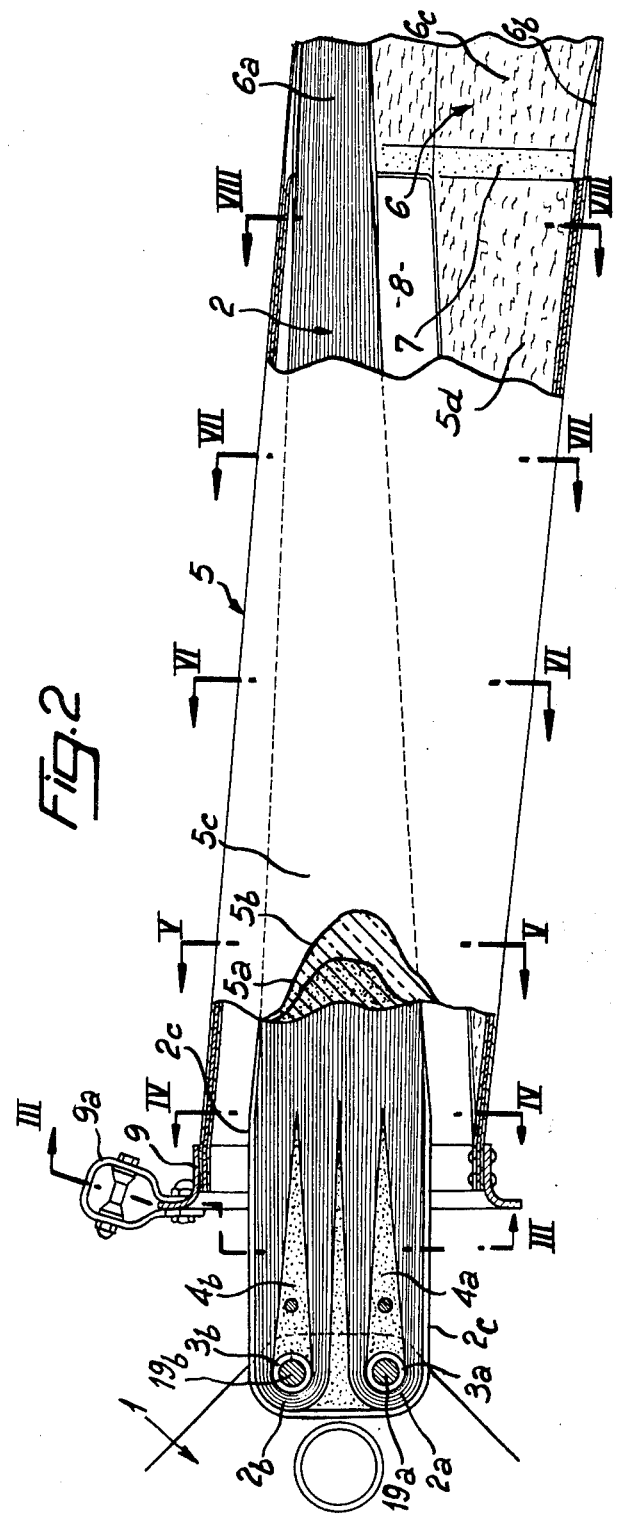

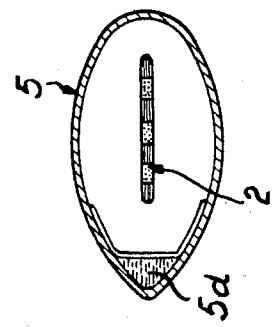
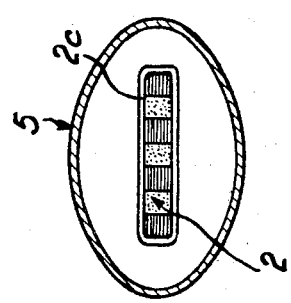
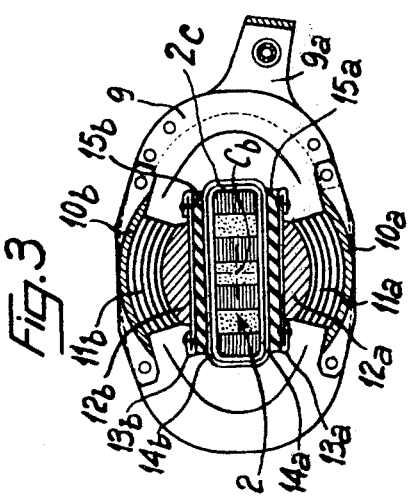
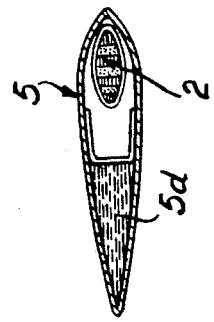
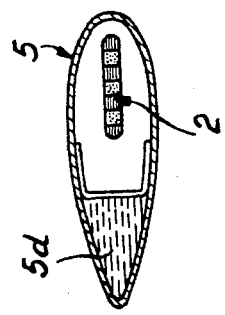
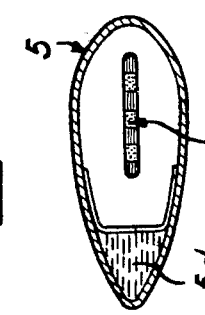

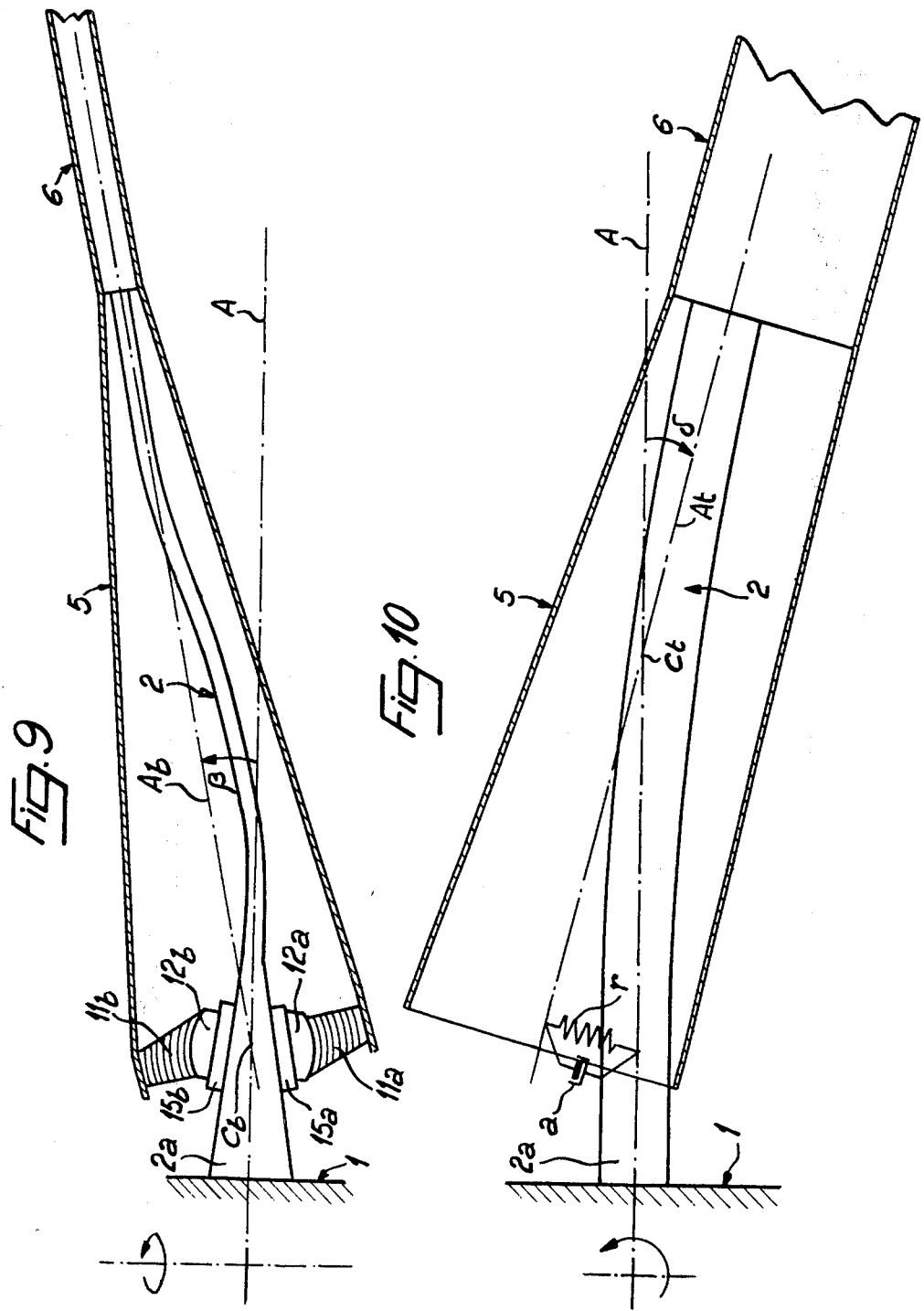

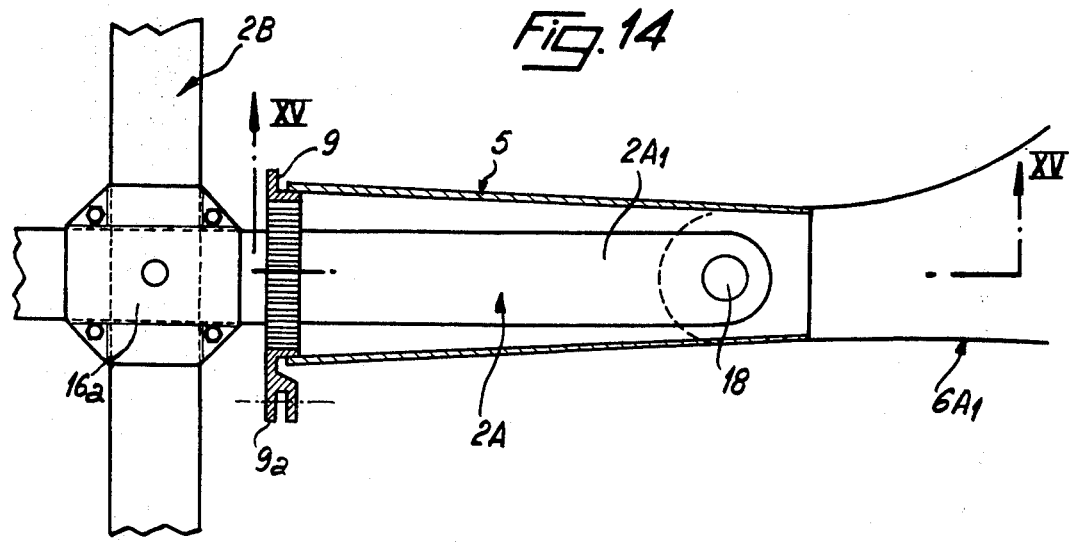
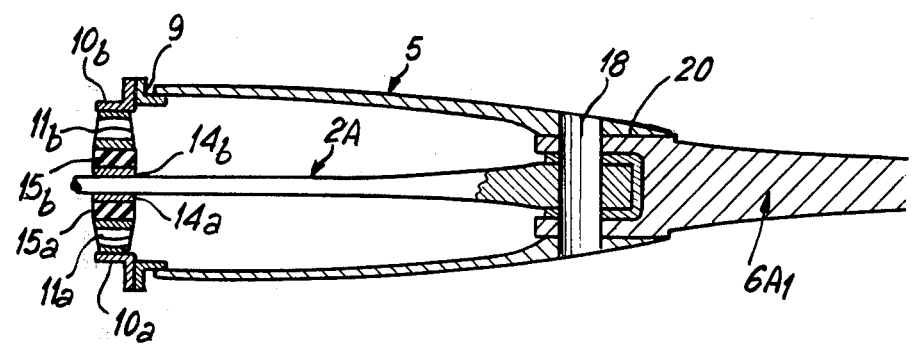

MAIN ROTOR FOR A HELICOPTER

The invention relates to a rotor, specially a main rotor for a helicopter.

There are already numerous kinds of known helicopter rotors. The most recent kinds of rotors are very light and particularly simple in construction, resulting in a considerable reduction in the cost and maintenance. Nevertheless the aforementioned excellent qualities are not always accompanied by sufficient aerodynamic efficiency.

However, some known kinds of rear (anti-torque) rotors combine the aforementioned qualities with remarkable aerodynamic efficiency. French Pat. No. 74 31664 filed on Sept. 19, 1974 describes a tail rotor having two blades, comprising a flexible strip-shaped spar held at its mid part between two plates secured to the rotor shaft, the blades comprising two stream-lined-shells, each surrounding a half of the spar and connected thereto only at its ends. The aerodynamic efficiency of this tail rotor is due to the fact that the cross-section of each blade shell varies progressively from one shell end, having a same cross-section as the blade itself, to the other shell end, having an annular cross-section and forming a tubular sleeve mounted cylindrical flange, which is connected by two pairs of flexible studs of resilient material to the plates secured to the rotor shaft. The strip-shaped spar is made of glass fibres agglomerated by thermoset synthetic resin. The studs of resilient material act as bearings for the root parts of the two blades during starting or stopping of the rotor, when the centrifugal force is insufficient to stretch and stabilize the flexible spar. During changes in blade pitch, the studs permit large changes in the relative position of each cylindrical flange; the studs also form a pivot for each blade when the flexible spar bends.

A tail rotor of the aforementioned kind has relatively short, rigid blades, and consequently its strip-like spar can be made sufficiently rigid in the rotor plane to satisfy the following usual condition:

$$\omega_\delta > \Omega, \qquad (1)$$

where $\omega_\delta$ corresponds to the frequency of the first natural drag vibration mode of each rotor blade, and $\Omega$ denotes the angular velocity of the rotor.

However, there are serious difficulties in constructing a main helicopter rotor in accordance with the teaching of the aforementioned French Pat. No. 74 61664. The main difficulty is that, in view of the relative length and relatively low rigidity of the blades of a main rotor, it is practically impossible to construct a strip-shaped spar which is sufficiently rigid in the rotor plane to satisfy the aforementioned condition (1). Consequently, the aforementioned Patent will only permit to construct a main rotor having low drag rigidity, so that its drag oscillations will be only slightly damped. That will result in a helicopter equipped with such a rotor having the following serious disadvantages: there will be a considerable risk of the dangerous phenomena known as "ground resonance" and "air resonance", and dangerous resonance phenomena will occur when the rotor rotation speed, during its increase to the rated value $\Omega$ when the rotor starts, or its decrease from the rated value when the rotor stops, passes through a value near $\omega_\delta$ corresponding to the frequency of the first natural drag vibration mode of each blade.

On the other hand, U.S. Pat. No. 3,231,222 to W. J. Scheutzow describes a helicopter rotor wherein each blade is associated with a substantially radial metal strip which is surrounded without contact by a tubular rigid sleeve. The outer ends of each strip and of the surrounding sleeve are secured to the root part of the corresponding blade by means of a fork and a pivot extending in a direction parallel to the rotor shaft through the prongs of the fork end through the blade root part inserted between said prongs. A ring of elastic material is inserted between the inner end of the rigid sleeve and a radial extension of the rotor shaft secured to the inner end of the metal strip. The elastic ring, which has a substantially rectangular radial cross-section, may allow blade and drag movements of the corresponding blade, and also allow the blade to pivot around its longitudinal axis during changes in pitch. However, the elastic ring does not accurately define the positions of the axes of the beat and drag movements of the blade, and it is further inadequate at damping the drag vibrations of the blade.

A chief object of the invention is a rotor, specially a main rotor for a helicopter, comprising a rotor hub, at least one blade, one flexible, twistable, substantially radial strip interconnecting said rotor hub and the root part of said blade, and one tubular rigid sleeve extending along said radial strip in a spaced and surrounding relationship thereto, the outer end of said strip and of the surrounding tubular sleeve being secured to the root part of said blade, at least one rigid ring secured to the inner end of said tubular sleeve, a blade pitch control lever being connected to the outside wall of said rigid ring, spherical ball and socket joint members inserted between said rigid ring and the flat surfaces of said radial strip, so that the centre of the ball and socket joint is substantially on the longitudinal axis of said radial strip, and drag frequency adaptors, each associated with one of said ball and socket joint members.

Another object of the invention is to achieve a rotor having all the required qualities, specially the aerodynamic efficiency, and wherein the position of the beat axis of each blade is accurately determined and the drag vibrations are strongly damped by drag frequency adaptators comprising plates of a high-hysteresis elastomer, which are subjected to alternating shear stresses by the said drag vibrations.

By way of example we shall now, with reference to the accompanying drawings, describe a number of embodiments of the invention. In the drawings:

FIG. 1 shows a first preferred embodiment, in elevation and partly in section;

FIG. 2 is a plan view corresponding to FIG. 1;

FIGS. 3 to 8 are views in section along lines III—III to VIII—VIII respectively in FIG. 2;

FIGS. 9, 10 are diagrams corresponding to FIGS. 1 and 2, FIG. 9 illustrating a beat displacement and FIG. 10 illustrating a drag displacement of a blade;

FIG. 14 is a partial plan view of a third embodiment, and

FIG. 15 is a sectional view along line XV—XV in FIG. 14.

Figure 11:
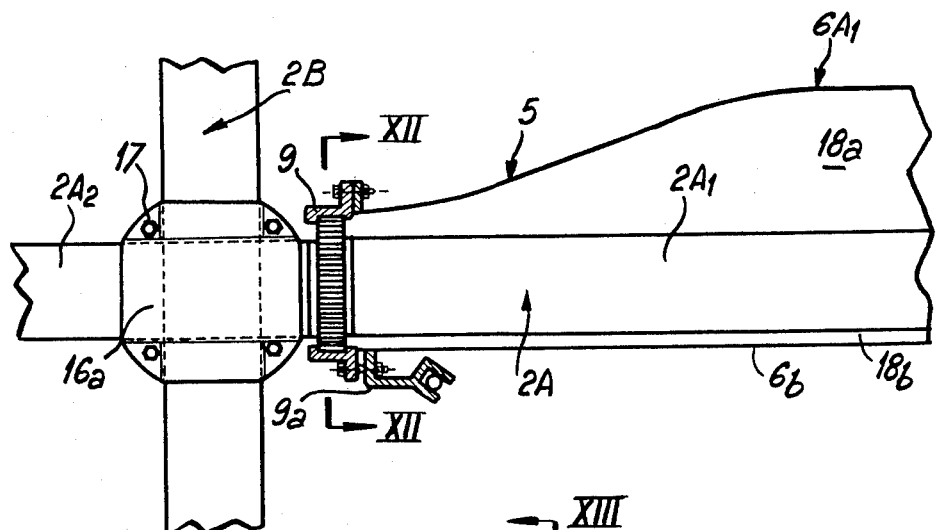
FIG. 11 is a partial plan view of a second embodiment.

In FIGS. 1 and 2, reference 1 denotes the hub body of a main helicopter rotor, having e.g. three blades, although the drawing shows only the part corresponding to one of the three blades. The rotor hub, which can be made in known manner of machined metal or alloy, is normally secured by any appropriate means to the top end of the helicopter rotor shaft (not shown). Each blade of the rotor hub is associated with a flexible, twistable strip 2 disposed substantially in a radial direction. In the embodiment under consideration, strip 2 preferably in known manner comprises a flat bundle of glass fibres impregnated with a thermosetting resin. The sectional views in FIGS. 3-8 show the variations in crosssection, specially in the thickness, of strip 2 in its longitudinal direction from its inner end near hub body 1 (FIG. 3) to its outer end near the root of the corresponding blade (FIG. 8). FIGS. 1-4 also show that strip 2 widens and thickens from its centre to its inner end, where the bundle of fibres forming the strip are subdivided to form two loops, 2a, 2b which surround metal sleeves 3a, 3b and wedge-shaped components 4a, 4b made of a low-density material, preferably a cellular synthetic material. The assembly is impregnated for instance with a thermoset synthetic resin so that the metal sleeves 3a, 3b are secured in the inner thick end of strip 2 which, in the illustrated embodiment, engages between the radial extensions 1a, 1b (FIG. 1) of the hub body 1, so that the bores of sleeves 3a, 3b coincide with the corresponding bores in the radial extensions 1a and 1b. The inner end of strip 2 can thus be secured to hub body 1 by pins 19a, 19b extending through the bores in the radial extensions of hub body 1 and through the metal sleeves 3a and 3b, the pins being secured by known means.

As also shown in FIGS. 1-4, the part of strip 2 nearest hub member 1 is surrounded by a lining preferably made up of sheets of glass fibre fabric, likewise impregnated with a thermosetting resin. The lining 2c completely surrounds the inner end of strip 2, secured to hub body 1, in the aforementioned manner.

The central part of strip 2 is surrounded without contact by a tubular rigid sleeve 5, which varies in crosssection in the longitudinal direction of strip 2, as likewise shown in the sectional views in FIGS. 4-9. In the embodiment in question, sleeve 5 preferably comprises the following three superposed layers: an inner layer 5a (FIG. 2) made up of carbon fibres interlaced in two directions at substantially 45° to the aforementioned longitudinal direction, a central layer 5b also of carbon fibres, all aligned substantially in the aforementioned longitudinal direction; and an outer layer 5c made up of sheets of glass fibre fabric, interlaced substantially at 45° and impregnated with a thermosetting resin. The three superposed layers are each e.g. 2 mm thick.

According to the invention, the outer ends of strip 2 and sleeve 5 are secured to the end of the moving part of the corresponding blade, which is given the general reference 6 in FIGS. 1 and 2. In the embodiment in question, the blade has a known structure, mainly comprising a spar in the form of a strip 6a surrounded by a stream-lined shell 6b. Spar 6a in known manner likewise comprises a bundle of glass fibres impregnated with a thermosetting resin and in one piece with the bundle forming the aforementioned strip 2; similarly, the stream-lined shell 6b of blade 6 is in one piece with the aforementioned tubular sleeve 5 or at least is a prolongation of its outer layer 5c made up of impregnated sheets of glass fibre fabric. The inner structure of blade 6 also comprises an elongate block 6c of low-density material, e.g. cellular synthetic material, inserted between spar 6a and the trailing edge of the stream-lined shell 6b of the blade. A layer of compound substance 7 is inserted so as to connect block 6c to a block 5d of similar material in the form of a wedge, extending from the root of blade 6 to the inner end of tubular sleeve 5 along that part of sleeve 5 which is in the prolongation of the trailing edge of the blade. Block 5d, like spar 6a or blade 6, is surrounded by a lining similar to those previously described, and the assembly is disposed so as to leave a space 6 (FIG. 2) between block 5d and strip 2 so that strip 2 can move relative to sleeve 5, as illustrated e.g. in FIGS. 9 and 10.

The inner end of sleeve 5 does not extend right up to the hub body 1 but stops at a certain distance from its radial extensions 1a and 1b. The aforementioned inner end of sleeve 5 is secured by any appropriate means to a rigid ring 9, preferably made of metal and substantially oval (FIG. 3), a minor side of which has a lug 9a for securing a lever (not shown) for varying the pitch of blade 6. Two holders 10a, 10b are secured by any appropriate means to the exterior of the major sides of ring 9 facing the hub body 1. Spherical ball and socket elements 11a, 11b (FIGS. 1, 3), preferably made of laminated elastomer in known manner, bear on holders 10a, 10b. Elements 11a, 11b are force-fitted between the aforementioned outer holders 10a, 10b and inner holders 12a, 12b which are suitably shaped and made of metal or moulded synthetic material, like the outer holders 10a and 10b. Elements 11a, 11b in known manner comprise a stack of laminations in the form of spherical caps, alternately made of metal and of a conventional elastomer. Those surfaces of holders 12a, 12b which face strip 2 are secured to metal plates 13a, 13b opposite two other metal plates 14a, 14b which are secured by any appropriate means to the major surfaces of strip 2 outside its outer lining 2c. As FIG. 3 shows, the two metal plates 14a, 14b can have longitudinal edges bent so as to overlap the minor sides of strip 2. Substantially rectangular plates 15a, 15b are disposed between the facing metal plates 13a, 14a and 13a, 14b and are made of very rigid high-hysteresis elastomer; their major surfaces are stuck by vulcanisation to the aforementioned metal plates.

The very rigid, high-hysteresis elastomer plates 15a, 15b inserted between the corresponding metal plates each constitute a visco-elastic effect drag frequency adaptor of a known kind, described in French Pat. No. 69 35410. The elastomer plates 15a, 15b serve both as return springs owing to their elasticity, and shockabsorbers owing to the great hysteresis of the elastomer of which they are made.

According to the invention, the position of the beat axis of each blade, the trace of which is denoted by Cb in FIGS. 1 and 3, is determined in the corresponding flexible strip 2 by the aforementioned spherical ball and socket joint elements 11a and 11b; to this end, elements 11a, 11b and the corresponding holders 10a, 10b and 12a, 12b are shaped so that the centre Cb of the resulting ball and socket joint is substantially on the longitudinal axis of the flexible strip 2. In the diagrammatic views in elevation and plan respectively in FIGS. 9 and 10. A denotes the rectilinear longitudinal axis of strip 2 in its normal position, where it is in line with the longitudinal axis of the corresponding blade 6 when the blade is not beating or dragging. FIG. 9 shows the position of strip 2 when the corresponding blade 6 beats upwards, the amplitude $\beta$ of the beat being defined by the angle between the aforementioned axis A and the prolongation Ab of the longitudinal axis of blade 6, which intersects axis A at the exact point Cb. FIG. 9 also shows the relative positions of strip 2 and sleeve 5 during the aforementioned beating of blade 6, and the deformation of the two laminated elastomer elements 11a, 11b enabling the blade to beat.

The thickness of blade 2 should be chosen so that it can be deformed by bending, as shown in FIG. 9, so that blade 6 can beat. On the other hand, strip 2 should have sufficient rigidity, i.e. sufficient thickness, to withstand the weight of blade 6 without breaking or excessive sagging when the rotor is at rest and the weight of the blade is not compensated by the vertical component of the resultant of the aerodynamic forces applied to the blade when the rotor rotates. It is thus possible to eliminate the heavy, complex special devices (e.g. a reciprocal ring or an abutment which is retracted by centrifugal force) which are otherwise necessary in order to bear the weight of each blade when the rotor stops. However, the rigidity, i.e. the thickness, of blade 2 should not be excessive, since otherwise an excessive control force will be required to twist strip 2 in order to vary the pitch of blade 6. A considerable control force results in the disadvantage of the need for installing complicated, expensive servo controls, possibly comprising a double hydraulic circuit to obtain the desired reliability.

In the diagrammatic plan view in FIG. 10, At denotes the prolongation of the longitudinal axis of blade 6 in the position which it occupies when the blade drags, the amplitude of drag being defined by the angle δ between axis At and the aforementioned axis A. Axes A and At intersect at the drag centre Ct, i.e. the trace of the vertical drag axis on the plane of FIG. 10. The drag centre Ct is near the middle of strip 2. FIG. 10 also shows that the tubular sleeve 5, which is secured to the sectional shell of blade 6, exactly follows the drag of the blade, owing to the deformation by shearing of (a) the elastomer strips making up elements 11a, 11b and (b) the plates 15a and 15b, which are made of very rigid high-hysteresis elastomer. Of course, the aforementioned deformation of the elastomer components results in a torque which pulls back sleeve 5 and blade 6 connected thereto to the inoperative position where their common longitudinal axis is in line with the axis A ($\delta=0$) as illustrated in FIG. 2. Accordingly, sleeve 5 should be dimensioned so as to have sufficient rigidity. However, the return motion of blade 6 and sleeve 5 connected thereto, towards the inoperative position ($\delta=0$), is damped by the action of the high-hysteresis elastomer plates 15a, 15b. The same applies to the drag oscillation of each blade 6 of the rotor according to the invention. The combined effects of elasticity and shock-absorption are diagrammatically represented in FIG. 10 by a spring r and a shock-absorber a inserted in parallel between (a) a point on strip 2 sufficiently near rotor body 1 to be substantially stationary with respect thereto and (b) a point on the rigid tubular sleeve 9, specially along its longitudinal axis.

The width of strip 2 should be chosen in accordance with the following considerations. As shown in FIG. 2, the strip becomes narrower towards spar 6a, so as to move the drag centre Cd away from the visco-elastic device a-r represented by elements 11a, 11b and 15a, 15b. Finally, the width of strip 2 can be made such that the pulsation $\omega\delta$ corresponding to the first natural vibration drag mode of the blade satisfies the following relation:

$$0.7\Omega \leq \omega_\delta \leq 0.8\Omega. \quad (2)$$

If on the other hand $\omega_\delta$ is made less than $0.7\Omega$ the drag is not sufficiently damped by the high-hysteresis elastomer plates 15a and 15b, whereas if $\omega_\delta$ is made greater than $0.8\Omega$, drag amplitude of each blade and the resulting stresses, specially on strip 2, will become excessive.

The applicants have constructed a rotor of the aforementioned kind wherein $\omega_\delta = 0.8\Omega$ and $\omega_\beta = 1.06\Omega$, $\omega_\beta$ corresponding to the frequency of the first mode of natural drag vibration of the blade; in order to obtain optimum dimensions for the frequency adaptor plates, their rigidity had to be approx. 110 dan/mm, which means that the drag vibration of the blades could be damped by only 4-5%. If necessary, however, the drag vibrations can be additionally damped by known means, for instance by aerodynamic damping by bringing about "beat-pitch" ("k" connection) and "beat-drag"-type coupling. If "k" connections are used, i.e. coupling by means of variously-shaped pitch levers, perfect control of the "k" connections is particularly easy in the case of a rotor hub according to the invention, since the position of the beat axis of each rotor blade is accurately determined as previously explained.

As previously mentioned, the variations in pitch of blade 6 corresponding to pivoting of the blade around its longitudinal axis are transmitted thereto by the rigid tubular sleeve 5 via the metal ring 9 and the pitch control lever secured to lug 9a. Consequently, sleeve 5 must be sufficiently rigid to transmit the pitch-change torque to blade 6, whereas strip 2 should have only a moderate torque opposing the pivoting of blade 6, the torque being accompanied by a return torque in the same direction produced by deformation of elements 11a, 11b and plates 15a, 15b.

In order to prevent the resulting return torque from becoming excessive and requiring an excessive control force, it is particularly necessary for elements 11a, 11b to have relatively low rigidity during torsion. However, if elements 11a and 11b are dimensioned accordingly, there is a disadvantageous reduction in the damping efficiency of the frequency-adaptor plates 15a and 15b since, when blade 6 drags as illustrated in FIG. 10, the shearing force applied to each pair of superposed elements 11a-15a and 11b-15b produces deformation in each pair of elements which is substantially inversely proportional to the rigidity of each element; consequently, if element 11a or 11b has low rigidity, the corresponding element 15a or 15b is only slightly deformed, so that its return torque and damping effect are small. Consequently, in determining the rigidity of elements 11a, 11b, a compromise has to be made between the aforementioned two contradictory requirements.

However, in a particularly advantageous embodiment of the rotor hub according to the invention, the frequency adaptor plates are shaped so as to be incorporated in each laminated elastomer ball and socket joint element. In the last-mentioned embodiment, the rigidity with which each element opposes deformation corresponding to drag of the corresponding blade can be made very small, which simultaneously results in an increase in the torsional flexibility of the joint elements, i.e. the rigidity with which each element opposes the pitch variation control torque transmitted thereto by the corresponding rigid ring 9.

As compared with all known rotor hubs, the embodiment of a hub according to the invention illustrated in FIGS. 1–8 has the advantages of a very simple structure, since the rotor hub is substantially reduced in the hub body 1, which is directly secured to the inner ends of strips 2 which directly prolong the spars of blade 6. The result, clearly, is a considerable reduction in the weight of the rotor and in maintenance costs and a considerable improvement in the aerodynamic efficiency of the rotor head.

Figure 12:
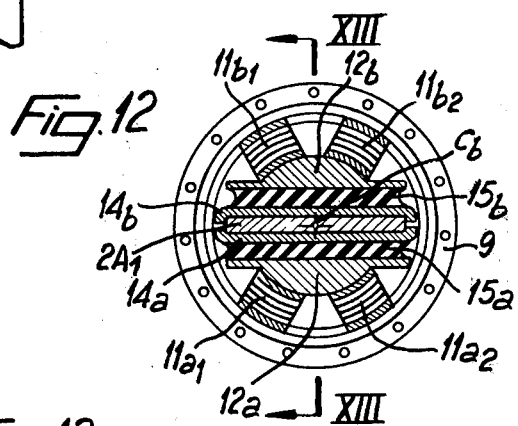
FIGS. 12 and 13 are views in section along lines XII—XII in FIG. 11 and XIII—XIII in FIG. 12 respectively.
Figure 13:
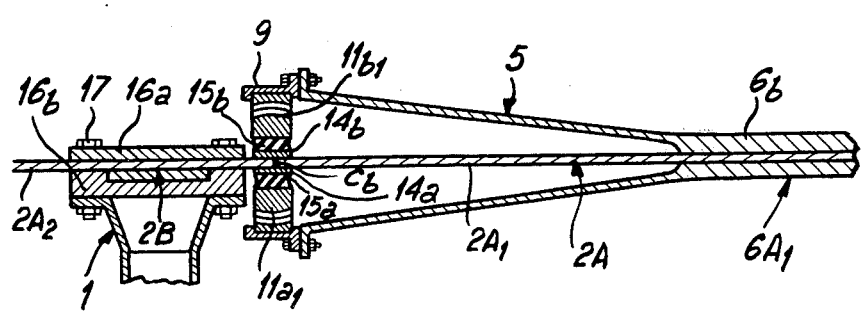

FIGS. 11–13 are diagrams of an embodiment of the invention corresponding to a rotor comprising a number of pairs of blades, for instance two pairs of blades opposite one another, i.e. a four blade rotor, specially a tail or anti-torque rotor. As shown more particularly in FIG. 11, an equal number, for instance two, flexible twistable strips 2A and 2B are disposed so that their superposed central parts are secured in a casing in two parts 16a and 16b (see also FIG. 13) made e.g. of cast metal. The casing, specially its bottom part 16b is secured to the top end of the rotor shaft or hub body 1 by bolts such as 17, which also secure together the two parts 16a, 16b of the casing and the central parts of the strips 2A, 2B between them. The two free parts (e.g. 2A1 and 2A2) of each strip (e.g. 2A), which are outside the casing 16a–16b, constitute the radial strips of the rotor hub according to the invention, which serve the same purpose as the strip 2 in the embodiment illustrated in FIGS. 1–8; as before, strips 2A,2B each preferably comprises bundle of fibres of glass or of the synthetic material commercially known as Kevlar, the fibres being embedded in a synthetic thermosetting substance. In the embodiment illustrated in FIGS. 11–13, each blade (e.g. 6A1) in known manner comprises a strip-shaped spar in one piece with strip 2A1, which it prolongs towards the right in FIGS. 11 and 13. The spar of each blade (e.g. 6A1) is also surrounded by a stream-lined shell 6b which, as shown one the right of FIG. 13, tightly surrounds the two flat major surfaces of the spar, whereas spaces 18a, 18b are left between the edges of the spar and the inner parts of shell 6b and correspond respectively to the leading edge and the trailing edge of blade 6A1. Near the rotor hub, the streamlined shell 6b of each blade 6A1 has variations in cross-section as clearly shown in FIGS. 11 and 13. This prolongation of shell 6b forms a tubular rigid sleeve 5 which, without contact, surrounds the corresponding part of strip 2A1. The inner end of tubular sleeve 5 is secured to a rigid ring 9 and two pairs of spherical ball and socket joint elements 11a1–11a2, 11b1–11b2, made of laminated elastomer, are inserted between the two flat major surfaces of strip 2A1 and ring 9 respectively, so that the centre Cb of the ball and socket joint is substantially on the longitudinal axis of strip 2A1 as shown in FIGS. 12 and 13. In addition, plates 15a, 15b made of very rigid, high-hysteresis elastomer are inserted between (a) the inner holders 12a, 12b of two pairs of spherical ball and socket joint elements and (b) two metal plates 14a, 14b which tightly grip strip 2A1 as shown in the sectional view in FIG. 12. A lug 9a is secured to the side of ring 9 by any appropriate means, and the pitch control lever (not shown) in articulated to lug 9a.

The required dimensions and the operating characteristics of the rotor hub illustrated in FIGS. 11–13 and previously described are practically identical with what has been previously stated regarding the embodiment in FIGS. 1–8. In the second embodiment likewise, the dimensions can be such that $\omega_\delta$ is less than the rotor operating speed, not only without the risk of instability but also so as to obtain the following advantages: there is a reduction in the drag moments applied to the parts of strips 2A, 2B enclosed in casing 16a–16b and it is thus possible to construct the strips from a material having a lower elasticity modulus, which has a favourable effect on the beat stresses and the cost; finally, and as a result, a reduction can be made in the width of strips 2A, 2B and consequently in the bulk of the rotor hub and the tubular sleeves such as 5.

FIGS. 14 and 15, in which the same references are used to denote components corresponding to the previous Figures, represent a third embodiment which is the same as that illustrated in FIGS. 11–13, describes previously, except that each strip 2A of the rotor hub according to the invention is not in one piece with the corresponding blade 6A1 (or at least with its strip-shaped spar); instead, the outer end of each strip 2A is connected to the root of the corresponding blade 6A1 by a pivot 18, the axis of which is substantially perpendicular to the plane of the rotor (i.e. to the plane of FIG. 14). Pivot 18 preferably engages in self-lubricating rings or collars. Owing to the drag articulation embodiment by pivot 18, the blade 6A1 and the tubular sleeve 5 connected thereto can drag with respect to strip 2A by a greater amount than the amplitude of the drag movements permitted by the previously-described embodiments. As a result, the frequency adaptor plates 15a, 15b are all considerably deformed by the corresponding cutting forces, thus increasing their shock-absorbing efficiency. The connection between the tubular sleeve 5 and the root of blade 6A1 is given maximum rigidity by fitting the root and, if necessary, sticking in a recess 20 formed in the outer end of sleeve 5.

The invention is not limited to the previously-described embodiments but includes all variants. Rotors according to the invention can be used both as mains rotors and as rear or anti-torque rotors for helicopters and all rotary-wing aircraft in general.

We claim:

1. A rotor, specially a main rotor for a helicopter, comprising a rotor hub and at least two blades
   each of said blades includes a spar made of a bundle of glass fibres impregnated with a thermosetting resin,
   said bundle being prolonged beyond the blade root towards said rotor hub to constitute a substantially radial flexible and twistable strip, having a substantially rectangular cross section and presenting a decreasing thickness from its outer end near the blade root to its central flattened portion between the blade root and said rotor hub, and an increasing thickness from said central portion to its inner end, where said strip is at the thickest and constitutes a relatively thick terminal part for attachment to the rotor hub,
   said strip being surrounded in a spaced-relationship by a tubular rigid sleeve extending along the strip and secured by its outer end to the blade root and by its inner end to a rigid ring to the outside wall of which a blade pitch control lever is connected, said rigid ring surrounding the portion with increasing thickness of the strip which is prolonged beyond said rigid ring in the direction of said rotor hub by said relatively thick terminal attachment part, in which rotor there is inserted between each flat surface of said portion with increasing thickness of the strip and the surrounding rigid ring, from the longitudinal axis of said strip to the rigid ring, a stacking comprising a drag frequency adaptor consisting of a plate of elastomer having great rigidity and high hysteresis, and a laminated part-spherical ball and socket joint member, each said joint member being inserted between the associated plate of elastomer and said rigid ring so that the common center of said joint members is substantially on the longitudinal axis of said radial strip, the said elements and the strip shape determining the flap axis of the corresponding blade cutting the strip longitudinal section on the common center of the ball and socket joint members and the drag axis shifted in the central flattened portion of said strip.

2. A rotor according to claim 1, wherein said strip widens from its outer to its inner end.

3. A rotor according to claim 1, wherein the bundle of fibres forming the strip is subdivided in its relatively thick terminal attachment part to form two loops surrounding metal sleeves secured in said relatively thick terminal attachment part, said strip being connected to said rotor hub, by two pins extending through the metal sleeves and coinciding bores in radial extensions of said hub.

4. A rotor according to claim 1, wherein each blade further comprises a stream-lined shell, surrounding said blade spar, the outer end of each surrounding tubular sleeve being connected to the inner end of said stream-lined shell of the corresponding blade.

* * * * *